United States Patent
Ramamurthy et al.

(10) Patent No.: US 9,445,323 B1
(45) Date of Patent: Sep. 13, 2016

(54) NETWORK IDENTIFIER RESERVATION IN RESPONSE TO HANDOFF

(71) Applicant: Sprint Spectrum L.P., Overland Park, KS (US)

(72) Inventors: Suryanarayanan Ramamurthy, Olathe, KS (US); Rajat Kumar, Kansas City, KS (US); Talat Jamshidi, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 141 days.

(21) Appl. No.: 14/308,255

(22) Filed: Jun. 18, 2014

(51) Int. Cl.
*H04W 36/00* (2009.01)

(52) U.S. Cl.
CPC ..... *H04W 36/0072* (2013.01); *H04W 36/0066* (2013.01)

(58) Field of Classification Search
CPC .............. H04W 36/0072; H04W 36/0066
See application file for complete search history.

(56) References Cited

U.S. PATENT DOCUMENTS

| | | | | |
|---|---|---|---|---|
| 2006/0094431 A1* | 5/2006 | Saifullah | ............... | H04W 36/14 455/436 |
| 2007/0147299 A1* | 6/2007 | Ando | ................ | H04L 29/12311 370/331 |
| 2007/0264979 A1* | 11/2007 | Park | ................. | H04L 29/12311 455/414.1 |
| 2007/0274259 A1* | 11/2007 | Sayegh | ............. | H04W 36/0011 370/331 |
| 2008/0151868 A1* | 6/2008 | Kezys | ................. | H04L 12/4641 370/352 |
| 2008/0205342 A1* | 8/2008 | Radhakrishnan | . | H04W 36/0033 370/331 |
| 2008/0233963 A1* | 9/2008 | Alanara | ................ | H04W 12/06 455/438 |
| 2011/0280215 A1* | 11/2011 | Nakagawa | ............ | H04W 36/14 370/331 |
| 2014/0086208 A1* | 3/2014 | Murray | ............. | H04W 36/0072 370/331 |
| 2015/0334752 A1* | 11/2015 | Li | ..................... | H04W 74/0816 455/418 |

* cited by examiner

*Primary Examiner* — Brian D Nguyen (57) ABSTRACT

A method is disclosed to help keep a UE's network identifier available for reassignment to that UE even after that UE engages in a particular type of handover. In accordance with the method, a network may make a determination that a UE should engage in a particular type of handover. In response to making this determination, the network may terminate the UE's active connection. However, based on the particular type of handover in which the network determined that the UE should engage, the network may also reserve the network identifier assigned for the UE's active connection.

20 Claims, 5 Drawing Sheets

NETWORK IDENTIFIER RESERVATION IN RESPONSE TO HANDOFF

BACKGROUND

Unless otherwise indicated herein, the materials described in this section are not prior art to the claims and are not admitted to be prior art by inclusion in this section.

In typical cellular wireless communication systems, wireless communication devices (e.g., cell phones, personal digital assistants, laptops, netbooks, tablets, and/or other wirelessly equipped devices, any of which may be referred to as a user equipment device (UE) for brevity) subscribe to service from a given cellular wireless service provider. In practice, a service provider will operate one or more networks (sometimes referred to as radio access networks (RANs)) including base stations that radiate to define one or more wireless coverage areas, referred to as sectors, where the subscriber UEs can operate.

Generally, wireless communications between a given UE and a serving base station in a RAN are carried out in accordance with one or more air interface protocols such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1×RTT and 1×EV-DO), GSM, GPRS, UMTS, EDGE, iDEN, TDMA, AMPS, MMDS, WIFI, and BLUETOOTH, or others now known or later developed. Through each base station (and corresponding RAN), a UE can obtain connectivity to other networks such as the public switched telephone network (PTSN) and the Internet. In addition to base stations, each RAN may include one or more switches or gateways that provide connectivity with one or more packet-switched networks. Conveniently with this arrangement, a UE that is positioned within coverage of the RAN may communicate with a base station and in turn, via the base station, with other served devices, or with other entities on the packet-switched network.

OVERVIEW

In an effort to provide additional network capacity for subscriber UEs, service providers may, in some areas, provide multiple RANs, each of which may be arranged as described above, including a number of base stations configured to provide wireless coverage, and associated network infrastructure that provides connectivity with one or more packet-switched networks such as the Internet. Additionally or alternatively, service providers may, in some areas, provide base stations that are configured to operate on more than one frequency band. Example frequency bands, each of which defines a particular range of radio frequency spectrum, may include the 800 MHz band, the 1.9 GHz band, and the 2.5 GHz band, although others are possible. Base stations so configured may be able to provide service to UEs on each of these frequency bands, thereby increasing the total number of UEs that the base stations are able to serve.

In such areas, if a UE in communication with a base station of a RAN begins to lose coverage of that base station but detects sufficient coverage of a base station of another RAN, the UE may engage in an inter-RAN handover process. Through such a process, the UE may transition to be served instead by the base station of the other RAN and to continue engaging in the communication via the base station of that other RAN. Similarly, if a UE in communication with a base station on a given frequency band begins to lose coverage on that given frequency band but detects sufficient coverage on a different frequency band, the UE may engage in an inter-band handover process. Through such a process, the UE may transition to be served instead on the different frequency band by the same base station (or, perhaps, by a neighboring base station) and continue engaging in the communication on that different frequency band.

In practice, when a UE is engaging in an active connection with the network and the network determines that the UE should engage in either an inter-RAN or an inter-band handover, the network typically tears down the UE's active connection (to facilitate the handover), waits for the UE to reconnect on the other RAN, or the other frequency band, as the case may be, and then establishes a new active connection with the UE. As part of tearing down the UE's active connection, the network may release a network identifier (e.g., an Internet Protocol (IP) address) that was previously assigned for the UE's active connection. In some network arrangements for example, the network maintains a pool of available network identifiers from which it selects and assigns network identifiers to newly-established active connections. Typically in such arrangements, upon tear-down of an active connection, the network would release the active connection's network identifier back into the pool of available network identifiers. And when the network establishes a new active connection with the UE, the network may assign a new network identifier for the new active connection from the pool of available network identifiers.

However, switching identifiers in this way may be problematic. For instance, some entities on the packet-switched network that are in communication with the UE (such as external web servers, or the like) may generally identify the UE by the UE's network identifier. Thus, if a UE is communicating with such an entity before the UE hands over and then the UE attempts to continue communicating with that entity after handover (and thus, after the UE has been assigned a new network identifier), the entity may not, at first, recognize the continued communications as being from the UE. As a result, the UE and the entity may have to engage in a series of additional signaling in order to acquaint the entity with the UE and the UE's new network identifier. This may be undesirable because it may result in excess network signaling, which may lead to network congestion as well as a poor user experience.

To address this situation, and perhaps others, disclosed herein is a method that may help keep a UE's network identifier available for reassignment to that UE even after that UE engages in an inter-band or inter-RAN handover. In accordance with the method, when a network makes a determination that a UE should engage in a handover, the network may responsively terminate the UE's active connection and release the network identifier assigned for that active connection. However, when the network's determination is that the UE is engaging in a particular type of handover (e.g., an inter-band or inter-RAN handover), instead of releasing the network identifier back into the pool of available network identifiers, the network may reserve the network identifier for reassignment to the UE after handover. By reserving the network identifier assigned to the UE's active connection when the network tears down that active connection, it may help to prevent the network from assigning a different network identifier to a new active connection established for the UE after handover.

In some embodiments of the method, the network may reserve the network identifier for just a threshold amount of time (e.g., 30 seconds) and release the identifier back into the pool of available identifiers if the UE has not reestablished an active connection with the network within that threshold amount of time. However, other ways of reserving the network identifier are possible as well.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments of the method are described herein with reference to the following drawings, wherein like numerals denote like entities.

DETAILED DESCRIPTION

1. Example Communication System Architecture

Referring to the drawings, as noted above, FIG. 1 is a simplified block diagram of an example wireless communication system in which at least one embodiment of the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in data storage or another medium such as a non-transitory machine-readable medium.

At a general level, an example wireless communications system includes at its core a RAN with at least one base station configured to communicate with suitably-equipped UEs that are positioned within coverage of the base station. Such UEs may engage in wireless communication over an air interface with the base station and may thereby communicate with remote entities on a packet-switched network(s), such as the Internet, and/or with other UEs served by the RAN. Generally, a RAN may communicate with subscriber UEs over an air interface according to one or more agreed air interface protocols, examples of which include any and all of the protocols described above. For example, in a UMTS system configured to operate according to LTE standards, the base station is usually referred to as an eNodeB or an eNB. In a CDMA system configured to operate according to the IS-2000 standard (sometimes referred to as 1×RTT) or the IS-856 standard (sometimes referred to as 1×EV-DO), the base station is usually referred to as a Base Transceiver Station (BTS) and is usually under the control of a Base Station Controller (BSC). Other architectures and operational configurations of a RAN are possible as well.

Figure 1:
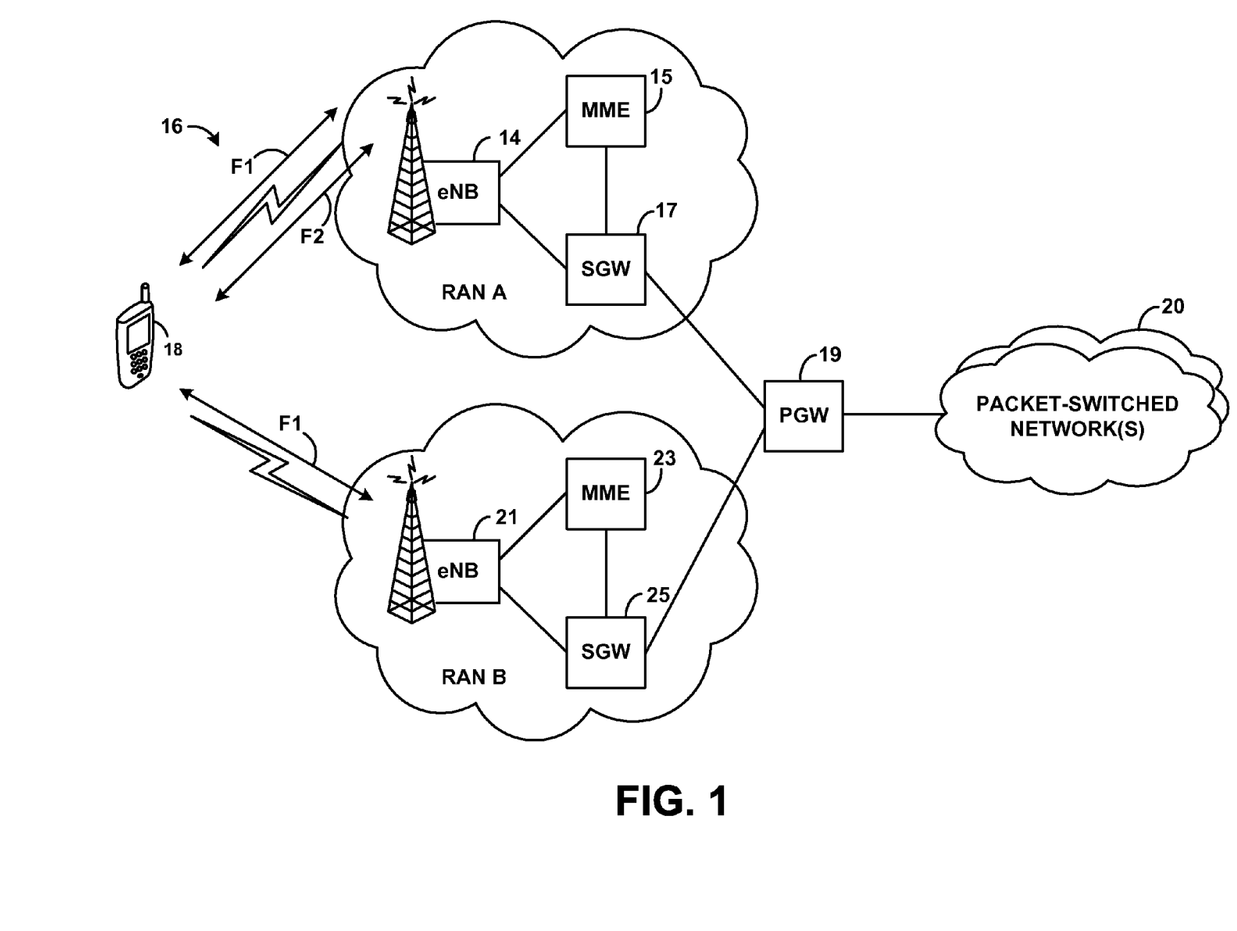
FIG. 1 depicts an example communication system, in which an example embodiment of the described arrangement can be implemented.

At a more complex level, but still by way of example, the example wireless communication system depicted in FIG. 1 includes a RAN A with an eNodeB (eNB) 13 that radiates to define a wireless air interface 16 over which the eNB 14 may communicate with at least one UE 18. The eNB 13 is shown coupled to various RAN backhaul entities, such as an MME 15 that typically coordinates bearer services (e.g., the establishment, maintenance, and release of bearer services) as well as the tracking and paging of subscriber UEs operating in RAN A. The eNB 13 is also communicatively coupled to an SGW 17, which may in turn be communicatively coupled to a PGW 19 that connects with one or more packet-switched networks 20, such as the Internet. SGW 17 may perform various administrative functions including maintaining bearer-service information for a given UE, including when the UE is in an idle state. PGW 19 generally functions to enforce QoS requirements, approve and/or direct the establishment of bearer services, and filter downlink data into pertinent bearer services. The interface (physical or logical network connection) between MME 15 and SGW 17 is known as an S11 interface, the interface between MME 15 and eNB 13 is known as an S1-MME interface, the interface between SGW 17 and eNB 13 is known as an S1-U interface, and the interface between the eNB 13 and other eNBs (not shown) in the RAN is known as an X2 interface.

As further shown in FIG. 1, the example wireless communication system may also include a second RAN B, arranged as described above with respect to RAN A, including an eNB 21 that radiates to define a wireless air interface over which eNB 21 may also communicate with at least one UE 18. Similarly, a SGW 25 of RAN B is shown communicatively coupled to PGW 19 in order to provide a connection, via RAN B, with one or more packet-switched networks 20, such as the Internet. Although RAN B is shown with a network infrastructure arranged in the same way as RAN A, it will be appreciated that RAN B, as well as other RANs not depicted in FIG. 1, can have network infrastructures arranged in alternative ways, with, for instance, more or fewer backhaul entities.

The network elements of RAN A and/or RAN B may be communicatively coupled to one or more additional network entities to assist in the performance of any of the functions described herein. For instance, MME 15 of RAN A may be communicatively coupled to a Home Subscriber Server (HSS) (not shown), which may contain various subscription data used to facilitate allocation of bearer services including QoS parameters, by the MME. Further, PGW 19 may be communicatively coupled to a Policy Control and Charging Rules Function (PCRF) (not shown), which may provide QoS authorization functions (e.g., QoS class identifiers and/or bitrates) and may ensure that a given QoS is in accordance with a given UE's subscription profile.

As further shown in FIG. 1, eNB 14 of RAN A provides service over air interface 16 on at least two frequency bands, F1 and F2. On the other hand, eNB 21 of RAN B is shown as providing service over an air interface on just frequency band F1. By way of example, F1 may be an 800 MHz band and F2 may be a 1.9 GHz band, although other examples are possible. More specifically, each frequency band F1 and F2 may generally define a downlink that carries wireless communications from the respective RAN to the UEs 18 and/or an uplink that carries wireless communications from the UEs 18 to the respective RAN.

2. Example Packet Gateway

Figure 2:
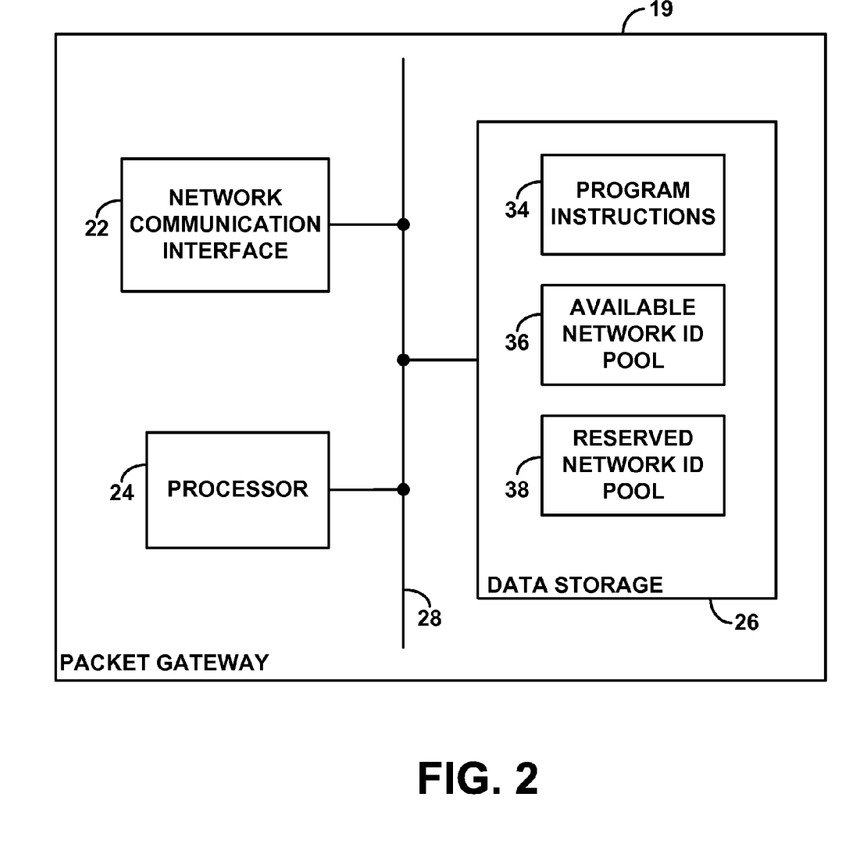
FIG. 2 depicts an example network device arranged to implement the present method.

FIG. 2 is a simplified block diagram of an example PGW 19 that may be configured to carry out certain network-side functions described herein. As shown in FIG. 2, the network device may include a network communication interface 22, a processor 24, and data storage 26, all of which may be coupled together by a system bus, network or other connection mechanism 28.

More specifically, but still by way of example, network communication interface 22 may generally be any wired (e.g., Ethernet) or wireless (e.g., WiFi) interface over which the network device can transmit and receive data with another entity. For instance, network communication interface 22 may be communicatively coupled to one or more SGWs, such as SGW 17 of RAN A (FIG. 1) or SGW 25 of RAN B (FIG. 1). Further, the network communication interface 22 may also be communicatively coupled with additional external entities (such as external web servers and the like) on the packet-switched network. Accordingly, PGW 19 facilitates communication between these external entities and one or more RANs.

Processor 24 may comprise one or more general purpose processors (e.g., microprocessors) and/or special-purpose processors (e.g., digital signal processors and/or application specific integrated circuits) and may be integrated in whole or in part with the network communication interface. Data storage 26 may comprise one or more volatile and/or non-volatile storage components, such as a non-transitory computer-readable medium, and may be integrated in whole or in part with processor 24. Some examples of non-transitory computer-readable media include a hard disk drive, a Compact Disc (CD), a Digital Video Disk (DVD), a digital tape, flash memory, although others are possible.

As further shown, data storage 26 may hold program instructions 34, which may be executable by processor 24 to carry out various functions described herein. For instance, in accordance with the program instructions 34, the processor 24 may function to receive via the network communication interface 22 from another network entity (such as SGW 17, MME 15, and/or eNB 14) an indication that UE 18 is engaging in a particular type of handover. In response, to the handoff being the particular type of handoff the processor 24 may tear down the UE's active connection but reserve for later reassignment the UE's network identifier.

To facilitate this, data storage 26 may include an available network identifier pool 36 and a reserved network identifier pool 38. Available network identifier pool 36 may store a list of network identifiers available for assignment to newly established active connections. And reserved network identifier pool 38 may store a list of those network identifiers that were previously assigned for UEs' active connections that were torn down in response to determining that those UEs were engaging in particular types of handovers. Thus, in response to receiving an indication that UE 18 is engaging in a particular type of handover, processor 24 may tear down the UE's active connection, but not release the active connection's network identifier back into the available network identifier pool 36. Instead, processor 24 may store the network identifier in reserved network identifier pool 38 together, perhaps, with a physical identifier of UE 18 (such as the UE's ESN or MEID) so that the PGW 19 can reassign the network identifier when UE 18 reestablishes a new active connection.

In accordance with this arrangement, the processor 24 programmed with instructions 34 may define part or all of a controller for controlling operation of PGW 19. Alternatively or additionally, however, such control functionality could be provided external to the PGW 19, such as within some other entity not shown but associated with RAN A or the packet-switched network(s) 20 in FIG. 1. Such an entity may be communicatively linked with PGW 19 and could serve to control aspects of PGW 19 and RAN operation generally.

3. Example User Equipment

Figure 3:
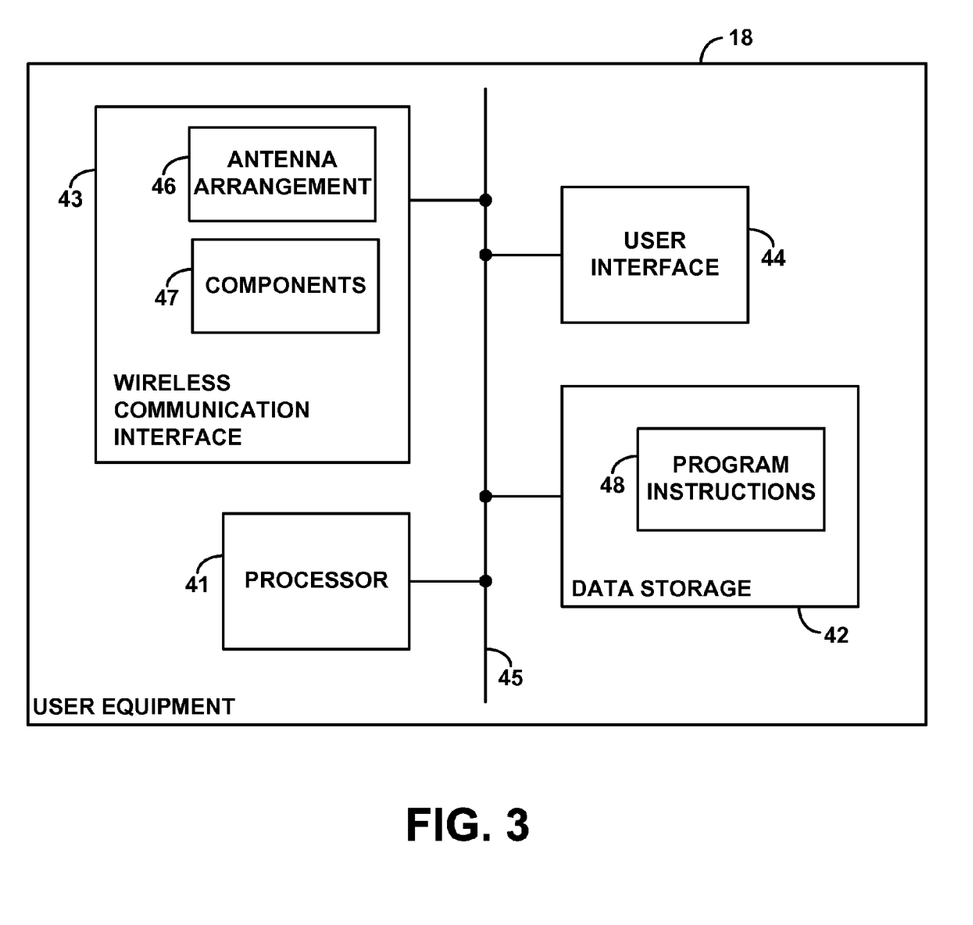
FIG. 3 depicts an example user equipment device arranged to implement the present method.

FIG. 3 is a simplified block diagram of a representative UE 18 (also possibly referred to as a mobile station, access terminal, a wireless communication device, or the like), such as a cellular telephone, wirelessly equipped tablet or personal computer, embedded wireless communication module, for instance. As shown, the representative UE may include a wireless communication interface 43, a user interface 44, a processor 41, and data storage 42, all of which may be coupled together by a system bus, network, or other connection mechanism 45.

Wireless communication interface 43 may comprise an antenna arrangement 46 and associated components 47, for engaging in communication with serving base stations, such as to transmit data and control information to the base stations and to receive data and control information from the base stations. For instance, the components 47 may include a mobile station modem, such as an MSM-series chipset. However, other modules that support other protocols are possible as well.

User interface 44 may facilitate interaction with a user of the UE if applicable. As such, the user interface may include output components such as a display screen, loudspeaker, and headphone jack, and input components such as a keypad, a touch-sensitive screen, and a camera.

Processor 41 may comprise one or more general purpose processors and/or special-purpose processors and may be integrated in whole or in part with wireless communication interface 43. Data storage 42 may comprise one or more volatile and/or non-volatile storage components, such as a non-transitory computer-readable medium, and may be integrated in whole or in part with processor 41. Some examples of non-transitory computer-readable media include a hard disk drive, a Compact Disc (CD), a Digital Video Disk (DVD), a digital tape, flash memory, although others are possible. As shown, data storage 42 may hold program instructions 48, which may be executable by processor 41 to carry out various UE functions described herein.

4. Example Network Identifier Reservation Procedure

As an initial matter, to establish an active connection and thereby communicate with entities on the packet-switched network, a UE and the UE's serving network may exchange a series of messages in order to open the proper channels of communication and establish the appropriate network resources for the active connection. This series of messages may begin with the UE sending an RRC Connection Request message to the UE's serving eNB. The RRC Connection Request message may contain a physical identifier of the UE (such as the UE's ESN, MEID, or another type of identifier). In response to receiving the RRC Connection Request message, the eNB sends to the UE an RRC Connection Setup message to indicate that the network recognizes UE and that the network is able to provide network services to the UE. The UE may then send to the eNB an RRC Connection Setup Complete message to acknowledge establishment of the RRC connection.

Once the RRC session is established between the UE and the eNB, the UE and the remainder of the network backhaul can communicate to establish bearer services for the UE's active connection, which will allow the UE to communicate with other entities on the packet-switched network. In accordance with one example of a bearer establishment procedure, the UE may send to the eNB a Service Request message including a Bearer Resource Allocation Request. In response, the eNB may forward the Service Request message to an MME. Upon receipt, the MME may engage in signaling with an SGW, and/or a PGW by way of the SGW, to communicate a Bearer Request message to the remainder of the network entities that make up the backhaul. A Bearer Request message generally notifies the network backhaul entities of the UE's request for bearer service. At this point the SGW and PGW may allocate the requested bearer resources for the communication and the PGW may assign for the UE's active connection a network identifier (such as an IP address). The network identifier may allow the PGW to identify the UE's active connection and to appropriately route incoming and outgoing communications. Additionally, other entities on the packet-switched network, such as web servers, may identify the UE by this network identifier.

In order to assign a network identifier, the PGW may refer to data storage (such as data storage 26 (FIG. 2)) where the PGW may have stored a pool of network identifiers (such as available network identifier pool 38 (FIG. 2)) available for assignment. The PGW may select a network identifier for assignment from the pool at random, or the PGW may select a network identifier from the pool in accordance with a first-in first-out arrangement, whereby the PGW selects the network identifier that has been in the pool the longest. However, the PGW may select an available network identifier for assignment in any number of other ways as well.

Once the PGW allocates the requested bearer resources and assigns a network identifier, the PGW may update its routing tables and send a Bearer Response message to the MME by way of the SGW. The MME may then send a Bearer Response message to the eNB to complete allocation of the requested bearer resources between the eNB and the MME. Finally, to activate the bearer service using the allocated bearer resources, the UE may send an Activate Bearer message to the MME by way of the eNB. The MME may responsively send a Create Bearer Response message to the SGW whereupon the SGW may send a Create Bearer Response message to the PGW to complete activation of the bearer service on the backhaul.

This active connection generally remains active until terminated by the network or the UE. As touched on briefly above, two example situations in which a network may terminate a UE's active connection and then later reestablish a new active connection for the UE are when the UE engages in an inter-band handover, or alternatively, an inter-RAN handover. As described briefly above, an inter-band handover is a process by which the UE transitions to be served on a different frequency band of the same eNB (or perhaps a different eNB). Likewise, an inter-RAN handover is a process by which a UE transitions to be served by an eNB of another RAN.

Upon a determination that a UE should engage in an inter-band or an inter-RAN handover, the network may tear down the UE's active connection, wait for the UE to complete the handover, and then establish a new active connection for the UE so that the UE can continue communication with other UEs and/or other entities on the packet-switched network. However, as part of tearing down the UE's active connection, the PGW may release the active connection's network identifier back into the pool of available network identifiers. Thus, once the UE completes the handover and the network reestablishes an active connection for the UE, the PGW may again refer to the pool of available network identifiers in order to assign an available network identifier to the UE's new active connection. Unfortunately, in some cases, the PGW may assign for this new active connection a different network identifier than the network identifier assigned for the UE's previous active connection. As noted, this practice may sometimes be problematic.

For instance, in some network arrangements, each data packet sent from the UE to a particular receiving entity on the packet-switched network may include in a header of the data packet the network identifier assigned to the UE's active connection. Receiving entities on the packet-switched network may thereby identify these data packets as being from the UE and may process them accordingly. However, if a UE's serving network terminates the UE's active connection and then reestablishes a new active connection having a different network identifier (such as when the network and UE engage in an inter-band or an inter-RAN handover), the receiving entity may not, at first, recognize data packets that contain the different network identifier as being from the UE. As a result, the UE and the receiving entity may have to engage in additional signaling in order to acquaint the receiving entity with the UE and the UE's new network identifier. This additional signaling may lead to excess network congestion as well as perhaps a poor user experience.

Figure 4:
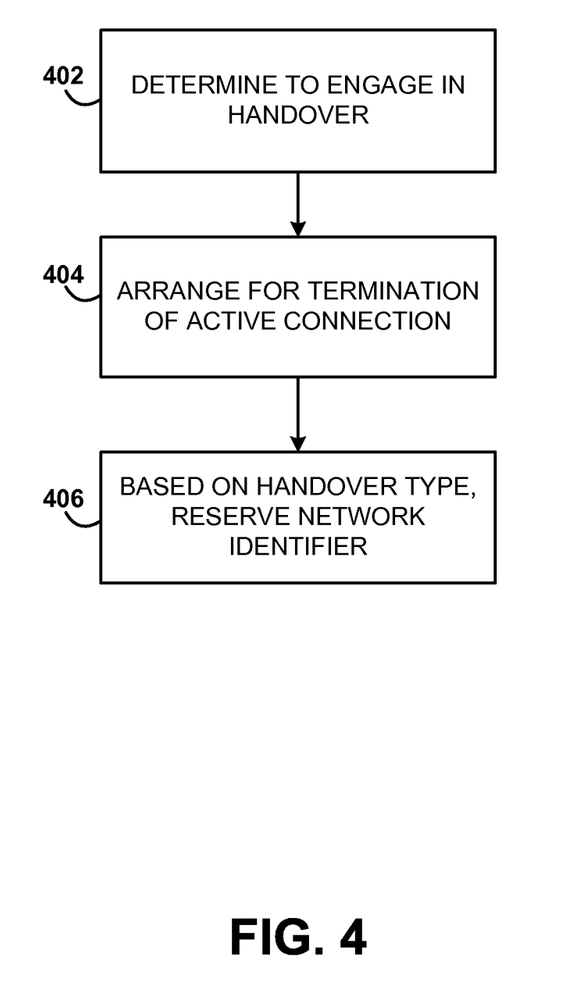
FIG. 4 is a flowchart depicting functions that can be carried out in accordance with the present method.

In accordance with one method designed to help address this potentially problematic situation, when a network determines that a UE should engage in a handover, the network may arrange for the termination of the UE's active connection and release of the active connection's network identifier. But when this handover is a particular type of handover, such as an inter-band or inter-RAN handover, the network may also arrange for the reservation of the released network identifier. FIG. 4 is a flow chart that depicts general functions that can be carried out by a network, in accordance with this method.

The functions depicted in FIG. 4 begin at block 402 where the network determines that a UE should engage in a handover. As a general matter, an eNB, for instance, may determine that a UE should engage in different types of handovers for different reasons. Typically, an eNB determines that a UE should engage in a handover based on one or more measurement reports transmitted to the eNB by the UE. Measurement reports generally contain indications of the strength of nearby network coverage from the point of view of the UE, such as coverage on another frequency band of the serving base station or coverage of a neighboring base station in the same, or perhaps a different, RAN.

In some embodiments of the method, an eNB may determine that a UE should engage in an inter-band handover when the UE reports stronger network coverage on a different frequency band than the frequency band on which the UE is currently operating. In another example, an eNB may determine that a UE should engage in an inter-RAN handover when the UE reports stronger network coverage on an eNB of a different RAN than the RAN on which the UE is currently operating. An eNB may determine that a UE should engage in an inter-band or inter-RAN handover for other reasons as well.

Continuing at block 404, the network may arrange for the termination of the UE's active connection in order to facilitate the handover. As mentioned above, for certain types of handovers, such as inter-band and inter-RAN handovers, the network may tear down a UE's active connection, wait for the UE to successfully hand over, and then reestablish a new active connection for the UE after successful handover. In one example of this, an eNB may notify a RAN backhaul entity, such as an MME, that the UE is going to engage in a particular type of handover. The MME may then responsively communicate with one or more RAN backhaul entities, such as a SGW or a PGW to arrange for the termination of the UE's active connection. However, other ways to arrange for the termination of a UE's active connection are possible.

At block 406, the network may—in response to the handover determined at block 402 being a particular type of handover (e.g., an inter-band handover or an inter-RAN handover)—reserve the network identifier that was assigned to the terminated active connection. For example, if the eNB determined that the UE should engage in an inter-band or an inter-RAN handover, then the eNB may responsively notify the MME of this determination. The MME may then instruct the PGW (by way of an SGW) to reserve the network identifier (e.g., the IP address) that was assigned to the UE's active connection when the PGW terminates the UE's active connection. In one example, the PGW may reserve a network identifier by storing the network identifier in a special location in data storage together with an indication of the particular UE to which it was previously assigned. Thus, upon successful handover, the PGW may recall this reserved network identifier and reassign the reserved network identifier to a new active connection established for the UE. However, other ways to reserve a network identifier are possible as well.

Figure 5:
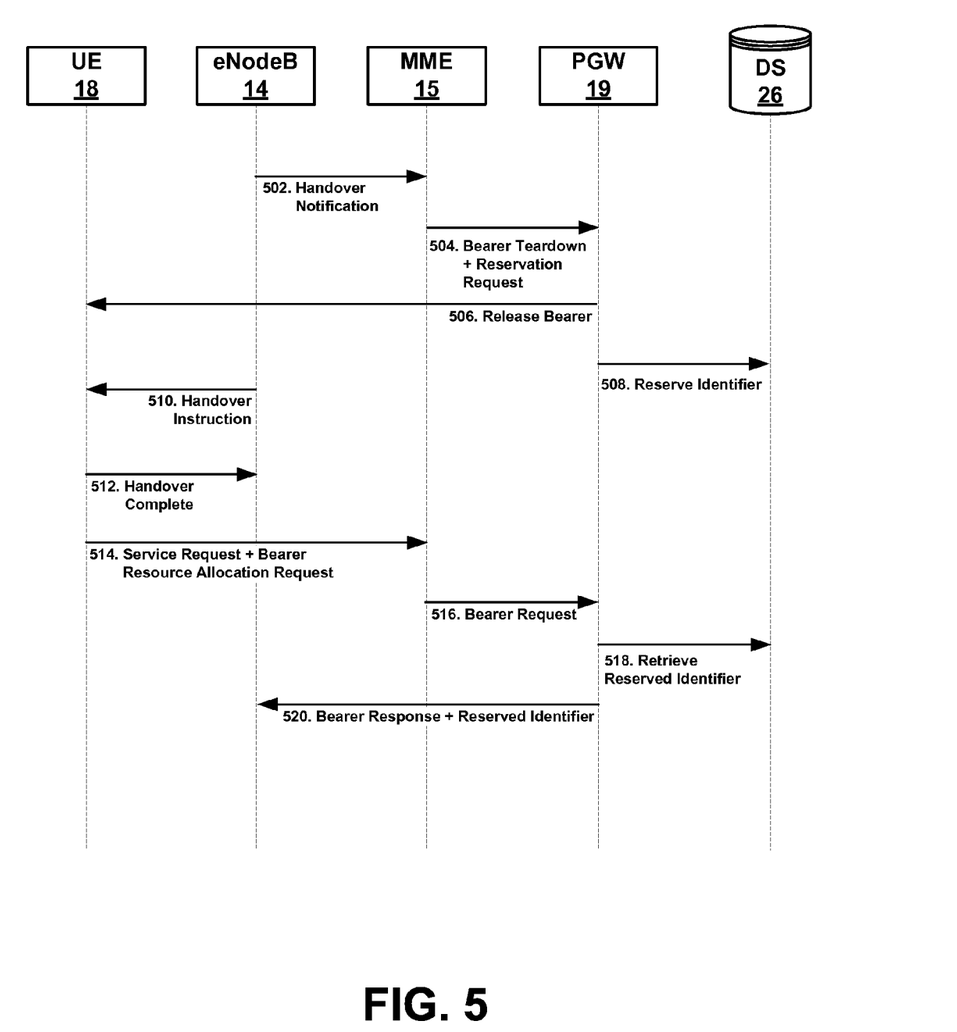
FIG. 5 depicts an example signal-flow diagram, in accordance with an example of the present method.

In order to more fully illustrate the network functionality described above, FIG. 5 depicts a signal-flow diagram of an example network identifier reservation procedure. The example procedure depicted in FIG. 5 involves various signals sent to, from, and between network elements: UE 18, eNB 14, MME 15, and PGW 19. The network elements depicted in FIG. 5 may generally correspond to the respective similar network elements described above with respect to FIG. 1. However, it should be understood that the network elements shown in FIG. 5 are shown for purposes of example and explanation only, and that additional or alternative network elements may be involved in a radio resource reservation procedure. Further, it should be understood that the particular messages depicted in FIG. 5 are set forth for purposes of example and explanation only and that additional and/or alternative messages may be used as well.

Initially, eNB 14 may determine that one of the eNB's served UEs, UE 18, should engage in a handover. In the example depicted in the signal-flow diagram of FIG. 4, eNB 14 may determine that UE 18 should engage in an inter-band handover; however, in other examples, the eNB may determine that the UE should engage in another type of handover, such as an inter-RAN handover, or even another type of handover altogether. As mentioned above, eNB 14 may determine that a UE should engage in an inter-band handover when the UE reports stronger network coverage on a different frequency band than the frequency band on which the UE is currently operating. However, in other examples, an eNB may determine that a UE should engage in other types of handovers for other reasons. For instance, an eNB may determine that a UE should engage in an inter-RAN handover when the UE reports stronger network coverage on an eNB of a different RAN than the RAN on which the UE is currently operating. The network may determine that a UE should engage in an inter-band or inter-RAN handover for other reasons as well.

Upon determining that UE 18 should engage in a handover, eNB 14 may generate and forward to MME 15 a handover notification, such as Handover Notification message 502, that specifies the UE 18 and the type of handover in which UE 18 is going to engage. For instance, the Handover Notification message 502 may specify UE 18 by a physical identifier of UE 18, such as the UE's MEID or ESN. Handover Notification message 502 may also contain an indication that eNB 14 determined that UE 18 should engage in an inter-band handover from frequency band F1 to frequency band F2 of eNB 14, for instance. However, in other examples, other types of handover notifications are possible as well.

In response to receiving Handover Notification message 502, MME 15 may determine whether the type of handover indicated in Handover Notification message 502 is a particular type of handover, such as an inter-band or inter-RAN handover. In response to determining that the handover is a particular type of handover (e.g., an inter-band or an inter-RAN handover as opposed to some other type of handover, for instance) MME 15 may transmit to PGW 19 a Bearer Teardown and a Reservation Request message 504. The Bearer Teardown and a Reservation Request message 504 indicates to PGW 19 to tear down the UE's active connection but reserve the network identifier assigned to that active connection.

Although not indicated on the example signal-flow diagram of FIG. 5, in some additional embodiments of the present method, in response to determining that the handover is not the particular type of handover (e.g., in response to determining that the handover is a type of handover other than an inter-band or an inter-RAN handover) the MME 15 may not transmit to PGW 19 a Reservation Request message. Thus, in these additional embodiments, PGW 19 may still teardown the UE's active connection as well as release the network identifier assigned to that active connection.

Upon receiving the Bearer Teardown and a Reservation Request message 504, the PGW 19 may release the bearer resources allocated to UE 18 and may transmit a Release Bearer message 506 to UE 18 by way of eNB 14. Additionally, the PGW 19 may reserve the network identifier in data storage 26. In one example of this, PGW 19 may use a Reserve Identifier message 508 to store in the reserved network identifier pool 38 (FIG. 2) an indication of the network identifier that was assigned to the UE's active connection. PGW 19 may also store with this network identifier a physical identifier of the UE, such as the UE's ESN or MEID. This may allow PGW 19 to later identify the network identifier specifically reserved for UE 18 so that PGW 19 may retrieve the reserved network identifier and assign it to a new active connection established for the UE.

After the PGW 19 tears down the UE's active connection, eNB 14 may transmit a Handover Instruction message 510 to UE 18. Handover Instruction message 510 may indicate to UE 18 the frequency band and/or the eNB on which to transition to operate. In the example depicted in the signal-flow diagram of FIG. 5, Handover Instruction message 510 may indicate to UE 18 to transition to operate on frequency band F2 of eNB 14. However, in other examples, the Handover Instruction message 510 may indicate other frequency bands and/or other eNBs on which to transition to operate.

In response to receiving Handover Instruction message 510, UE 18 may transition to operate on frequency band F2 on eNB 14. Once that transition is complete, UE 18 may send a Handover Complete message 512 back to the eNB. Additionally, UE 18 may transmit to MME 15 by way of eNB 14 a Service Request and a Bearer Resource Allocation Request message 514 in order to reestablish connectivity with PGW 19 and, ultimately, the packet-switched network.

Upon receipt of Bearer Resource Allocation Request message 514, MME 15 may transmit to PGW 19 a Bearer Request message 516 that indicates that UE 18 is requesting allocation of bearer resources. Responsive to receiving this Bearer Request message 516, PGW 19 may allocate the requested bearer resources thereby establishing an active connection for UE 18. PGW 19 may then dip into data storage 26 via a Retrieve Reserved Identifier command 518 to determine whether there is a network identifier reserved for UE 18. In one example of this determination, PGW 19 uses the Retrieve Reserved Identifier command 518 to query reserved network identifier pool 38 (FIG. 2) of data storage 26 for a network identifier reserved for a previous active connection of UE 18. If the PGW 19 locates such a reserved network identifier, PGW 19 may assign the reserved identifier to the newly established active connection for UE 18. However, If the PGW 19 does not locate a reserved network identifier for UE 18, then PGW 19 may refer to the pool of available network identifiers 36 in data storage 26 in order to select and assign an available network identifier to the UE's newly established active connection.

Once PGW 19 assigns the reserved network identifier to the UE's newly established active connection, PGW 19 may update its routing tables and transmit back to eNB 14 by way of MME 15 a Bearer Response message 520 (which may include an indication of the reserved identifier) to complete allocation of the requested bearer resources. Thus, based on the example network identifier reservation procedure depicted in FIG. 5, when the network determines that a UE with an active connection should engage in a certain type of handover, the network may tear down the active connection, but reserve the active connection's network identifier so that the network can reassign that network identifier to a new active connection established for the UE after a successful handover.

Although not indicated on the example signal-flow diagram of FIG. 5, in some additional embodiments of the present method, at the same time as MME 15 transmits to PGW 19 Bearer Teardown and Reservation Request message 504 MME 15 may also start a radio resource reservation timer for UE 18. In accordance with these additional embodiments of the present method, if the MME's radio resource reservation timer expires before MME 15 receives a new service request message from UE 18, such as Service Request and Bearer Resource Allocation Request message 514, then MME 15 may transmit to PGW 19 a message instructing PGW 19 to release any network identifier reserved for UE 18. In order to release a reserved identifier for UE 18, PGW 19 may refer to the reserved network identifier pool 38 in data storage 26 to locate a reserved network identifier for UE 18. Once located, the PGW 19 may move the network identifier into the pool of available network identifiers 36 of data storage 26. In this way, if UE 18 powers down or otherwise does not complete a successful handover, the PGW 19 does not continue to reserve a network identifier for UE 18. In some examples, the radio resource reservation timer expires after 30 seconds, although other time values are possible.

5. Conclusion

Various embodiments have been described above. Those skilled in the art will understand, however, that changes and modifications may be made to these embodiments without departing from the scope of the claims.

We claim:

1. In a wireless communication system in which a user equipment device (UE) is engaged in an active connection with a radio access network (RAN), the active connection being associated with a network identifier, a method comprising:
   the RAN making a determination that the UE should engage in a particular type of handover:
   in response to making the determination, the RAN terminating the active connection and receiving a message indicating that the RAN should reserve the network identifier; and
   based on the message indicating that the RAN should reserve the network identifier, the RAN reserving the network identifier for reassignment to a new active connection established between the RAN and the UE upon completion of the handover.

2. The method of claim 1, wherein the particular type of handover is an inter-frequency band handover.

3. The method of claim 1, wherein the particular type of handover is an inter-RAN handover.

4. The method of claim 1, wherein the network identifier is an Internet protocol (IP) address.

5. The method of claim 1,
   wherein the message indicating that the RAN should reserve the network identifier comprises a radio-resource release message,
   wherein the RAN terminating the active connection comprises at a base station that serves the UE before the handover, the base station transmitting to a RAN-backhaul entity the radio-resource release message, and
   wherein the RAN reserving the network identifier comprises the base station including in the radio-resource release message an indication to reserve the network identifier.

6. The method of claim 1,
   wherein the message indicating that the RAN should reserve the network identifier comprises a radio-resource release message,
   wherein the RAN terminating the active connection comprises a RAN backhaul entity receiving from a base station that serves the UE before the handover the radio-resource release message, and
   wherein the RAN reserving the network identifier comprises the RAN backhaul entity detecting in the radio-resource release message an indication to reserve the network identifier and the RAN backhaul entity responsively preventing the network identifier from being assigned to another UE.

7. The method of claim 6, wherein the RAN backhaul entity prevents the network identifier from being reassigned to another UE for at least a predetermined period of time.

8. A method comprising:
   at a radio access network (RAN) entity that (i) upon establishment of an active connection between the RAN and any given user equipment device (UE) assigns to the given UE a given network identifier from among a pool of available network identifiers, and (ii)

upon termination of the active connection releases the given network identifier back into the pool of available network identifiers, the RAN entity receiving an instruction to terminate an active connection between the RAN and a UE, wherein the active connection is associated with a network identifier, and wherein the instruction comprises an indication that the RAN should reserve the network identifier;

the RAN entity determining that the UE is engaging in a particular type of handover; and in response to the receiving and the determining, the RAN entity terminating the active connection without releasing the network identifier back into the pool of available network identifiers.

9. The method of claim 8, wherein the particular type of handover is an inter-frequency band handover.

10. The method of claim 8, wherein the particular type of handover is an inter-RAN handover.

11. The method of claim 8, wherein the network identifier is an Internet protocol (IP) address.

12. The method of claim 8, wherein the RAN entity determining that the UE is engaging in a particular type of handover comprises:

the RAN entity receiving from a base station that serves the UE before the handover an indication that the UE is engaging in the particular type of handover.

13. The method of claim 8, wherein the RAN entity terminating the active connection without releasing the network identifier back into the pool of available network identifiers comprises the RAN entity preventing the network identifier from being reassigned to another UE.

14. The method of claim 13, wherein the RAN entity prevents the released radio resource from being reassigned to another UE for at least a predetermined period of time.

15. A radio access network (RAN) entity configured to establish an active connection with a user equipment device (UE) and to assign a network identifier to the active connection, the RAN entity comprising:

a non-transitory computer readable medium (CRM);

at least one processor; and instructions stored on the CRM and executable by the at least one processor for carrying out functions including:

making a determination to engage in a particular type of handover for a UE;

in response to making the determination, arranging for the termination of the active connection and receiving a message indicating that the RAN should reserve the network identifier; and based on the message indicating that the RAN should reserve the network identifier, arranging for the reservation of the network identifier.

16. The RAN entity of claim 15, wherein the particular type of handover is an inter-frequency band handover.

17. The RAN entity of claim 15, wherein the particular type of handover is an inter-RAN handover.

18. The RAN entity of claim 15, wherein the network identifier is an Internet protocol (IP) address.

19. The RAN entity of claim 15, wherein the message indicating that the RAN should reserve the network identifier comprises a radio-resource release message, wherein arranging for the termination of the active connection comprises receiving from a base station that serves the UE before the handover the radio-resource release message, and wherein arranging for the reservation of the network identifier comprises detecting in the radio-resource release message an indication to reserve the network identifier and responsively preventing the network identifier from being reassigned to another UE.

20. The RAN entity of claim 19, wherein preventing the network identifier from being reassigned to another UE comprises preventing the network identifier from being reassigned to another UE for at least a predetermined period of time.

* * * * *